United States Patent [19]

Knepper

[11] Patent Number: 4,521,778
[45] Date of Patent: Jun. 4, 1985

[54] HIGH-RESOLUTION, COHERENT PULSE RADAR

[75] Inventor: Udo Knepper, Langenargen, Fed. Rep. of Germany

[73] Assignee: Dornier System GmbH, Friedrichshafen, Fed. Rep. of Germany

[21] Appl. No.: 347,109

[22] Filed: Feb. 9, 1982

[30] Foreign Application Priority Data

Feb. 27, 1981 [DE] Fed. Rep. of Germany ....... 3107444

[51] Int. Cl.$^3$ ............................................. G01S 13/10
[52] U.S. Cl. ............................. 343/13 R; 343/17.1 R
[58] Field of Search ............... 343/17.1 PF, 17.1 PW, 343/17.1 R, 13 R

[56] References Cited

U.S. PATENT DOCUMENTS 4,132,991  1/1979  Wocher ........................... 343/13 R Primary Examiner—Maynard R. Wilbur
Assistant Examiner—Gilberto Barrón, Jr.
Attorney, Agent, or Firm—Ralf H. Siegemund

[57] ABSTRACT

The invention concerns a procedure and a circuit arrangement for a coherent, high-resolution pulse radar applicable to distances from several tens of meters down to less than one meter and which evinces at the same time an accuracy in the cm range; the application is in particular to industrial monitoring operations.

Two highly stable pulse sequences are generated in the transmitter and differ only slightly with respect to their pulse repetition frequencies. Both sequences are shaped into microwave pulse bundles and one sequence is processed into transmitter pulses, the other sequence being processed into scanning pulses for a time-expansion procedure. Heterodyning with the scanning pulses takes place in the receiver mixer, the result being a combined formation of intermediate-frequency (IF) and time-expansion. In this manner the signal bandwidth is already decreased by the time-expansion factor in the IF part. This is made possible in that coherent phases are used, i.e., there is an arbitrary but constant time relationship between the rising edge of the controlling pulse and the starting time (initial phase) of the carrier oscillation produced in the microwave oscillator. The oscillators used are microwave resonators driven by extremely short control pulses.

18 Claims, 4 Drawing Figures

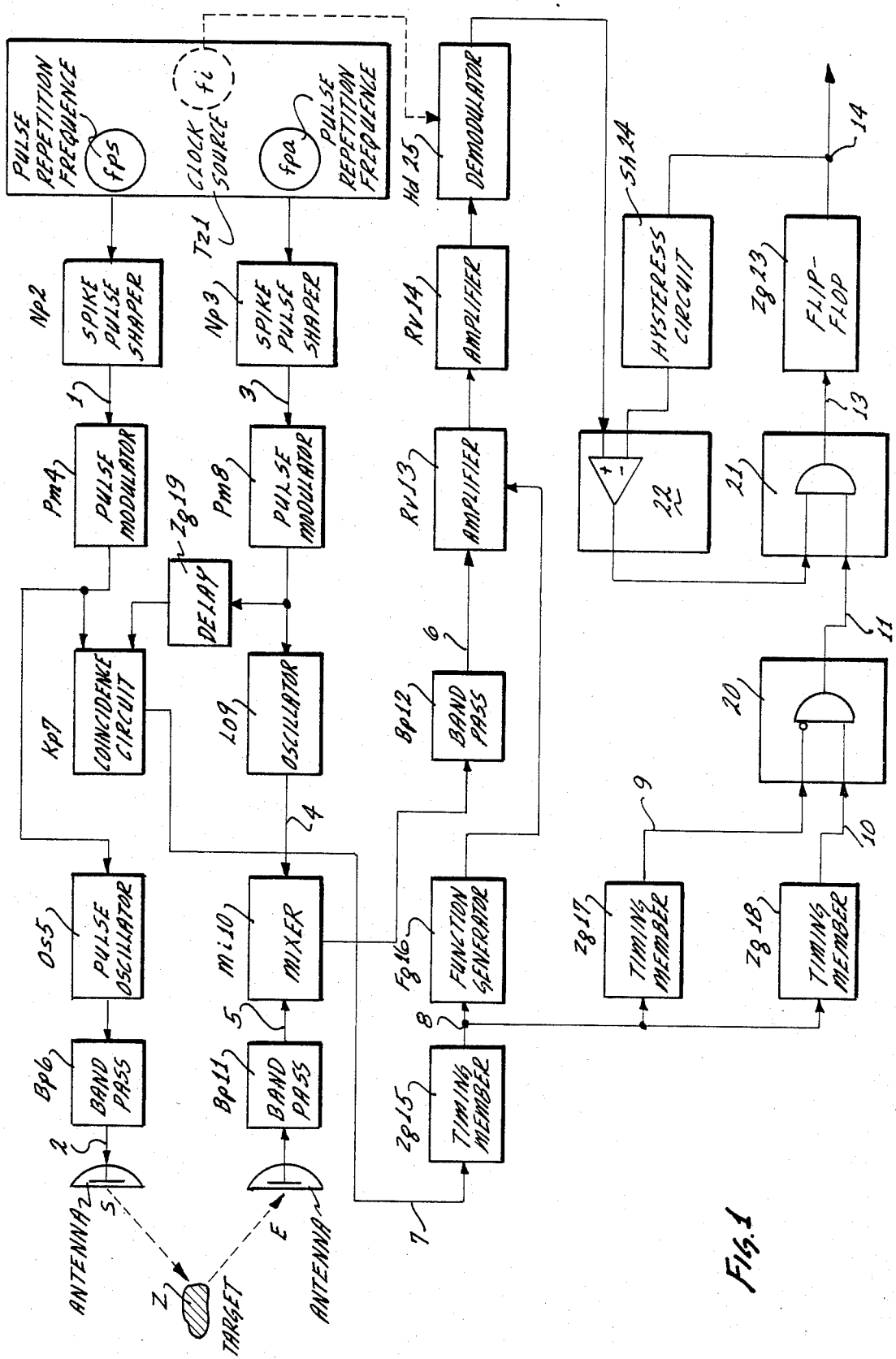

HIGH-RESOLUTION, COHERENT PULSE RADAR

The present invention relates to a high-resolution, coherent pulse radar for locating small targets at close ranges of the order of a few tens of meters down to less than a meter.

A problem frequently arises in practice to satisfactorily determine the presence of both fixed and of moving targets in the immediate vicinity. An example of many applications in industry, for instance, is rolling equipment requiring ascertaining prior to the initiation of a working procedure whether a slab has assumed its prescribed position, or whether it is moving. The distance should be ascertained as accurately as possible. If one were to restrict oneself to ascertaining the presence of moving targets only, the drawback would exist that a slab already in position would not be determined upon switching on the monitoring apparatus, and accordingly an erroneous switching command might be issued to the equipment. Therefore, it is necessary to detect both a fixed and a moving target within the predetermined monitoring range, and to detect them in an exact manner.

To date, numerous optical monitoring apparatuses have been used in industry for such monitoring purposes, being designed in part as mere light barriers and in part also as range finders based on the laser principle. The use of such apparatuses is essentially significant where the monitoring procedure is affected by the high focusing and the collimation feasible with light beams. However, optical procedures cease to be applicable when, in lieu of high focusing, a somewhat more substantial area must be detected. Moreover, they rapidly fail when dust, vapors or other soils affect the optics or when opaque obstacles such as non-metallic materials, for instance textiles, wooden partitions or plastic screens and the like stand in the way of the light.

Another kind of monitoring system instead of using light waves is based on ultrasonic waves. However, such apparatuses are difficult to use in industry where most of the time there are spurious acoustics effective even in the ultrasonic range. In the event that the ultrasonic range is excessively high in frequency in order to be above the spurious ultrasonic spectrum of the industrial noise, the drawback exists that the possible target ranges are much too small. Furthermore, there are difficulties in such cases requiring the detection of very rapid processes. This is due to the relatively slow propagation of ultrasonic waves, compared with that of electromagnetic waves such as light or radar.

Other monitoring systems known in practice operate on the principle of the inductive proximity switch. While such devices are insensitive to noise and soil, their range is exceedingly short, less than a meter, and they are only roughly directional, lacking any significant angular resolution.

The pulse radar technique has been used to date for the most varied ranges, for instance for navigation, which involves distances up to a few hundred km, with correspondingly long pulses and pulse travel times, down to distances of about 100 m, for instance for ship radars. The pulse radar technique also has been used in independent distance-warning devices in automobile traffic. In this case the significant distance range is about from 5 to 100 meters separation, the distance resolution requiring at most accuracies of 1 m. This accuracy however is wholly inadequate for the above-cited industrial applications, which require a resolution in the cm range.

The known indepedent distance-warning device for motor vehicles (Nachrichtentechn. Zeitschrift 29, 1976, Vol. 9, pp 667–672) operates as a conventional bistable pulse radar. This equipment emits pulses about 30 ns long with a carrier frequency exceeding 30 GHz and with a pulse repetition frequency of 500 kHz. The individual pulses in the pulse train are mutually incoherent. Intermediate frequency (IF) signals of 300 MHz are formed from the detected echo pulses in the receiver by means of a heterodyne oscillator, then are filtered several times in a laborious manner, amplified and demodulated. High requirements must be placed on the frequency stability of the heterodyne oscillator. As regards the Gunn oscillator used in the distance-warning device, the required frequency stability could only be achieved using thermostatic controls for the oscillator. However, such cost should be avoided in the field of application initially cited. The video signals at the output of the IF part are subjected by means of a sampling or scanning procedure to a time-transformation in a low-frequency range. Due to the time-expansion effect, the subsequent analysis can be carried out using relatively simple electronics, and the video then can be fed to a direct microprocessor treatment. The principle of this sampling or scanning procedure is that a scanning signal is generated the scanning frequency of which is slightly less (for instance by a few kHz) than the pulse repetition frequency of the radar. The ratio of the scanning frequency to the differential frequency so formed is the time-expansion factor for a time-transformation. The scanning time of a few nanoseconds is selected to be sufficiently short to produce an adequately faithful reproduction of the original video signal.

The transfer of the large radar pulse technique to the distances arising in the independent distance measuring system places special requirements on the fast-pulse technique because, as regards travel time and distance, a corresponding shortening of the pulse duration is required, the carrier frequencies being in about the same GHz range. The semiconductor transmitters used in this radar do not permit generating pulse durations less than 10 nanoseconds and accordingly a higher distance resolution, such as is required for the purpose cited initially, cannot be achieved.

The distance resolution in the 1 m range required in the distance-warning system, however, requires substantial bandwidths in the IF amplifier, namely 150 MHz. While the expense in equipment is substantial, it still can be met. On the other hand, as regards the distances related to industrial monitoring cited above, still larger bandwidths are needed, namely about 1 GHz; for such bandwidths, IF amplification and filtering by the known method can no longer be achieved meaningfully, that is cost-efficiently. In the known distance-warning system, a sampling procedure to transform the video signal into a very low-frequency range can take place only after the costly IF amplification and the securing of a video signal.

Directional antennas are required for the application initially cited, which requires both high distance resolution and good angular resolution. Directional antennas of sufficiently small sizes as needed for the presently contemplated use can be achieved only when their relative bandwidth is not excessive, for instance when it is a maximum of 20%.

This condition determines the lowest possible radar frequency. A bandwidth of about 1 GHz is required to transmit a 1 ns long carrier pulse. To observe the requirement of the relative bandwidth of maximally 20% for the antenna, the carrier frequency must be at least 5 GHz. When using higher carrier frequencies, more directional antennas at constant size or smaller antennas at constant directionality can be used. There is a drawback however in using higher frequencies because of the rapidly rising costs associated with all microwave components for higher frequencies.

So-called base band radars have become known, which, on one hand, offer the desired distance resolution due to their nanosecond pulses, but which, on the other hand, do not have the desired high angular resolution. As no carrier frequency pulses are involved in this case, rather direct DC pulses, very large bandwidths, about 0.2-1 GHz do result, which must be processed by the antenna of the equipment. It is impossible to achieve a compact antenna of high angular resolution for this bandwidth. Accordingly, a base band radar hardly appears suitable for the initially cited purposes.

Consequently, the requirement for extremely high distance resolution with simultaneous high angular resolution by the radar can be achieved only at a rational cost by using a carrier frequency pulse containing at least several, for instance 5-10 oscillations.

In principle, this radar problem might be solved by the radar frequency modulation method (FM-CW). Because the same bandwidth for the same distance resolution is required in the FM-CW radar as for the pulse radar, extremely large frequency swings are required. In the present state of the art, it appears costlier to technically solve the problem of the frequency-modulated oscillator than the problem of the carrier frequency pulse generation in the pulse radar method. Due to the principle of constrained simultaneous transmission and receiving, there are furthermore high requirements placed on decoupling the transmitter and receiver branch.

This broad state of the art demonstrates that the problems above are most likely solved by resorting to the pulse radar system. Its prior limits were cited above, and the present invention addresses the task of finding an economical solution for the transmitter-side generation and the receiver-side processing of extremely short carrier frequency pulses, the time transformation required for the extremely rapid pulse phenomena being possible in conjunction with a scanning procedure.

The known pulse radar technique therefore must be altered, i.e., redesigned, in such a manner that it also permits accurate determination of distance and direction for targets in the closest proximity and up to several tens of meters. Moreover, relatively small targets—as compared to the range—also are satisfactorily detected, namely targets the size of a hand within the 5 m range.

An essential consideration is to provide a simpler solution regarding bandwidth and intermediate frequency (IF) for the receiving part, without thereby having to trade off drawbacks, for instance lower sensitivity and inadequate selectivity.

Moreover, the possibility of generating extremely short carrier pulses of the order of magnitude of 1 nanosecond was investigated, while simultaneously solving the problem of the adequately focused beams and of antenna receiving, as well as receiver problems concerning the processing of such short pulses, which were solved. The difficulties in IF processing due to broad bandwidth are avoided.

The requirements for a pulse radar procedure that are listed above are met in the present invention by the following steps:
(a) two highly stable pulse sequences are generated, one of which is processed into transmitter pulses and the other, which has a slightly lower pulse repetition frequency, is processed into scanning pulses;
(b) the two pulse sequences are shaped into microwave pulse packets of which the starting time (initial phase) is determined by the control pulse;
(c) the received echo signals are joined with the microwave scanning pulse sequence and time-expanded IF signals are formed, which are selectively amplified and demodulated into video signals;
(d) a time-expanded reference pulse for the video signals is formed from the two original pulse sequences by coincidence.

In a further design of the invention, a fixed-target analysis can be obtained from the video signals and the reference pulse, and using an IF reference signal, it is possible to perform a Doppler analysis from the receiver side IF signals by the most diverse and known criteria to detect moving targets.

The invention offers an essential difference and a substantial advantage over the distance-warning system in that the microwave scanning series is directly fed to the receiver mixer where it is processed together with the echo pulses. In this manner, heterodyning for the purpose of IF formation is combined with a time expansion into a very low frequency range already in the receiver mixer. This is an essential difference with respect to the IF formation in conventional heterodyning. While the absolute signal bandwidth is retained in the conventional case, the invention does decrease the absolute bandwidth by the time-expansion factor. The signal bandwidth is decreased, for instance, from 1 GHz to 100 kHz. Accordingly, it is already possible in the IF part to operate at substantially lesser costs and with simpler means.

Another very important difference with respect to the pulse generation in conventional radars resides in the characteristic that in the present invention an arbitrary but constant time relationship exists between the leading edge of the control pulse and the starting time (initial phase) of the carrier oscillation this pulse has generated in the microwave oscillator. This applies equally to the transmitter and the receiver sides. It is only this feature which makes it possible to implement the above stated combination of IF formation and time-expansion.

In the course of the scanning process generating the time-expansion, there is not a precisely shape-faithful reproduction of the time-transformed signal, contrary to the case for the known scanning method cited initially in relation to the known distance-warning apparatus, rather there takes place a somewhat distorted signal reproduction, which, however, does not interfere in the present case. Such a distortion, however, can be deliberately accepted because in this manner a far better signal yield is made possible. For little cost in equipment, the signal to noise ratio is substantially improved. The improvement in the signal to noise ratio is manifestly more significant for the method described herein than a high-fidelity reproduction of the receiver pulse.

The invention will be further illustrated by reference to the accompanying drawings, in which:

FIG. 1 is a block diagram of circuitry employed in one embodiment of the invention;

Figure 2A:
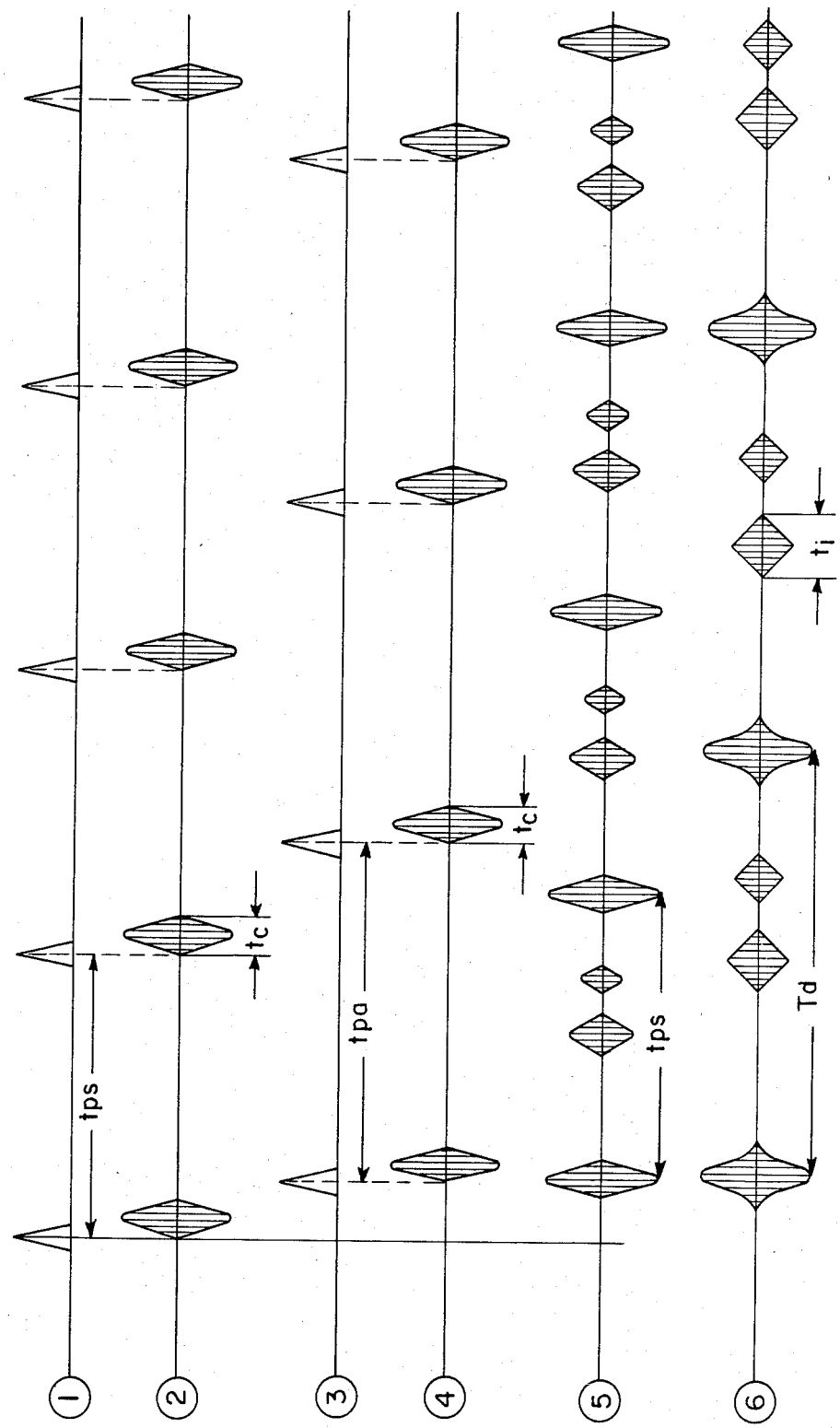
FIGS. 2a and 2b are time-functions of signals at various places in the block diagram.
Figure 2B:
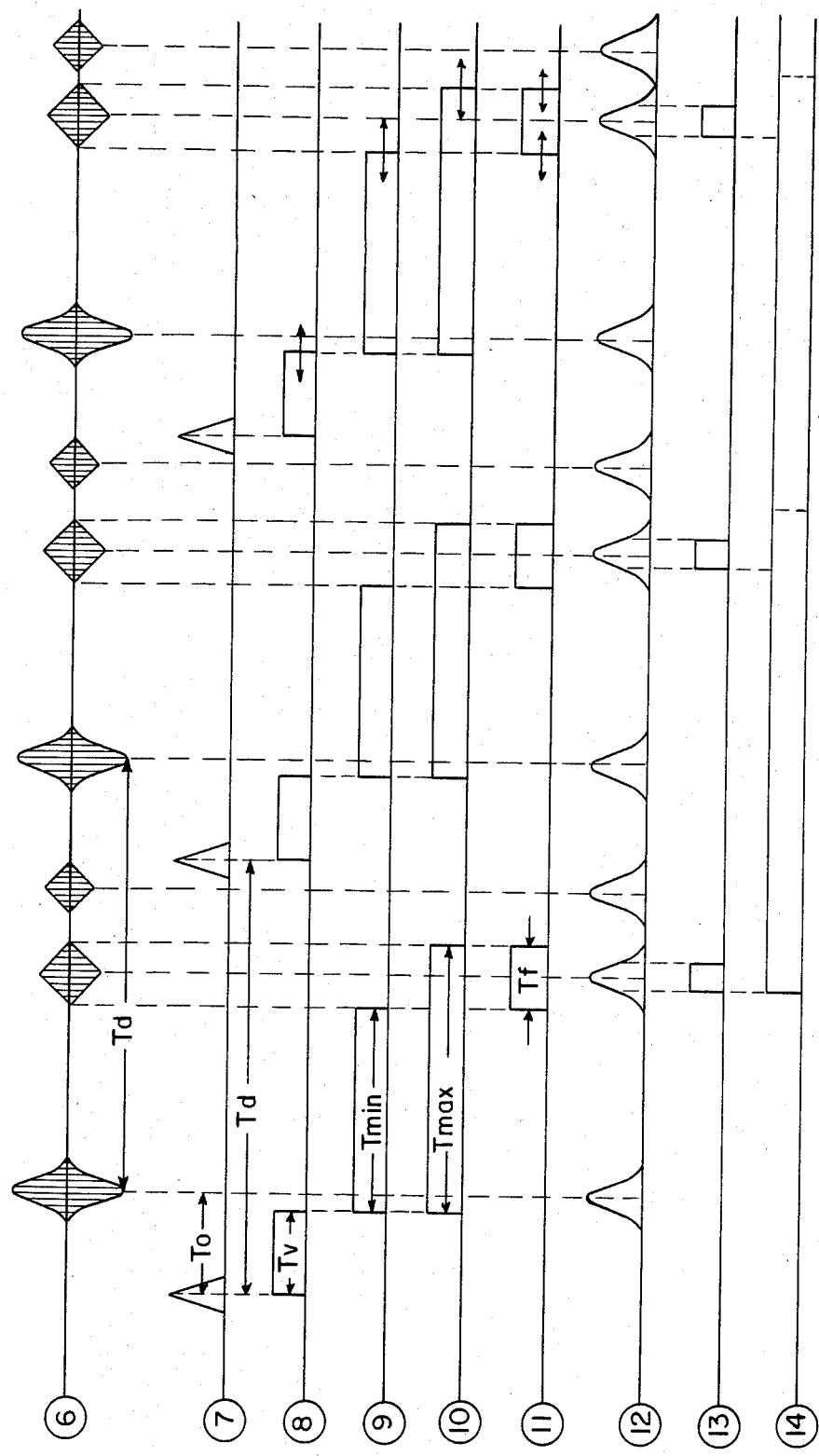

The schematic design and the operation of the invention will be described below in relation to the block diagram and FIG. 1, with references to the signals shown in FIGS. 2a and 2b. The pulse durations and the pulse spacings are not shown to scale in the time-function plots for the signals. The same applies to the amplitude. The time-scale for the signal functions 1–5 is everywhere the same. Another time scale is selected for the signal functions 6–14, though it is the same for all of these. In this manner coincidences or shifts between the individual pulse sequences can be seen. It is important to bear in mind however that a time expansion by a factor of about 10,000 is present between the signal functions of the group 1–5 and that of the group 6–14, and that a wholly different time scale is used for either group.

Two pulse sequences are generated in a clock source TZ 1. The one pulse sequence, for instance, is of the pulse repetition frequency $f_{ps}$ of 10 MHz and is further processed into transmitter pulses. To that end, the pulse train is shaped in a spike pulse shaper Np 2 into spike pulses. This can be carried out for instance by means of the known step-recovery diode. In order to obtain rising slopes as steep as possible in the spike pulses, several shaper stages may be cascaded. The signal function of the spike pulses is shown as "1" in FIG. 2a. The period is designated by $t_{ps}$. These spike pulses through the pulse modulator Pm 4 drive a transmitted pulse oscillator Os 5. The natural frequency $f_c$ of the oscillator Os 5 is selected to be in the microwave range, for instance at 5–10 GHz. The signals from the oscillator Os 5 are fed through a bandpass Bp 6 to the transmitting antenna S. These signals are shown in FIG. 2a as "2". The carrier-frequency oscillations of the signals are indicated by the shading. The signals "2" have the same pulse period $t_{ps}$ as the previous signals "1". The pulse duration $t_c$ is 1 ns for instance.

In a corresponding manner a second pulse sequence with the pulse repetition frequency $f_{pa}$ is generated. This pulse repetition frequency is somewhat less than that of the above first sequence, for instance it is 9,9990 MHz. This pulse sequence is shaped through the spike shaper Np 3 and a pulse modulator Pm 8 into the above-mentioned spike pulses with very steep slopes. The signals passing through this branch are shown as "3" in FIG. 2a. A somewhat longer period $t_{pa}$ than for the first pulse sequence "1" of the first pulse sequence is apparent. The generated spike pulses drive an oscillator Lo 9 which is tuned to about the same microwave frequency as the transmitter oscillator. The carrier frequency pulses generated by the oscillator Lo 9 are shown in FIG. 2a as "4". They too are indicated by their shading as the carrier frequency. Again their period is $t_{pa}$ and their pulse duration is $t_c$. These carrier frequency signals "4" are fed as scanning signals to a microwave mixer Mi 10.

It must be noted furthermore with respect to the oscillators Os 5 and Lo 9 in the processing channels of the two pulse sequences that phase-locked carrier pulses are generated in them due to the applied spike pulses. Preferably, passive microwave resonators are used as oscillators, which are excited by the spike pulses into decaying oscillation. The envelope of the carrier frequency pulse can be shaped for instance by a subsequent bandpass, for instance Bp 6.

The characterizing feature of these pulse oscillators with a natural frequency $f_c$ typically selected to be in the microwave range is that a fixed time relationship exists between the spike pulse and the starting time of the generated oscillation packet.

Figure 3:
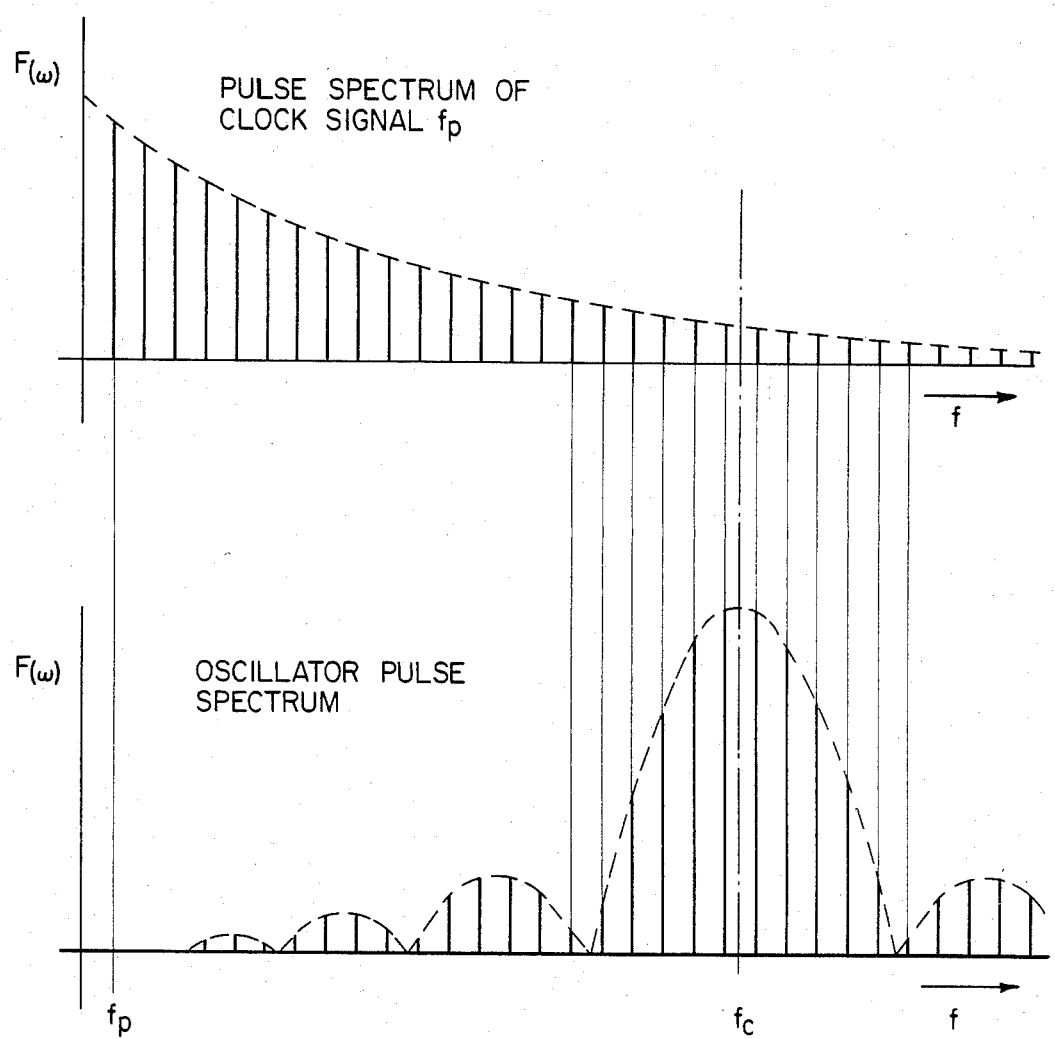
FIG. 3 shows the amplitude spectra of the pulses.

The coherence of the phases in the pulse repetition frequency $f_p$ and the generated oscillation $f_c$ has such an effect in the frequency spectrum shown in FIG. 3 that the lines of the oscillator signals coincide with the harmonics, that is, with the integral multiples of the pulse repetition frequency $f_p$. Within the range of the middle oscillator frequency $f_c$ these harmonics form the pulse spectrum of which the envelope is determined by the Fourier transform of the pulse oscillations (see "2" and "4" in FIG. 2a) of the oscillator.

As shown by FIG. 3, the natural frequency $f_c$ of the oscillator determines only the center of gravity of the envelope of the pulse spectrum, independently of the proximity of the lines.

If as shown here there are only a few oscillations, then the associated pulse spectrum will evince very many lines. Because of this large bandwidth there results the advantage, as regards equipment, that the constancy of the natural frequency of the oscillator will have to meet only very moderate requirements. Therefore, the transmitter oscillator Os 5 and the heterodyne oscillator Lo 9 need be tuned only approximately to the same natural frequency $f_c$.

As indicated in dashed lines in FIG. 1, the pulses emitted by the transmitter antenna S are reflected by a target Z and after a range-dependent travel time are detected by the receiving antenna E. These signals are passed through a bandpass Bp 11 and fed to a microwave mixer Mi 10. The received signals have the signal shape "5" of FIG. 2a. Again their period is $t_{ps}$. In addition to the clearly shown antenna leakage signals, the signals function "5" also shows two echo signals from different targets and of different echo sizes, all signals being assumed.

In the mixing procedure described below, any frequency offset $\Delta f_c$ between the receiver signal "5" and the heterodyne signal "4" will cause only minor loss of signal.

The mixer Mi 10 can be implemented by a conventional microwave diode mixer, preferably in the bridge or double bridge arrangement to better decouple its three gates.

The heterodyne signal or the scanning signal "4" fed to the mixer Mi 10 has the same shape of the oscillation packet as the assumed target signal "5". It differs by its constant and larger amplitude and most of all by its slightly lesser pulse repetition frequency $f_{pa}$.

As a first approximation, the mixing process can be described as a multiplication of the received and heterodyne signals. The subsequent filtering using the IF bandpass Bp 12 generates the received signal "6" transformed into an expanded time domain (FIG. 2a). Using the above numerical examples, a time expansion factor of about 10,000 is obtained and a reproduction repetition frequency $f_d$ of 1 kHz. The time expansion is shown in FIG. 2a for the signal "6" by another scale. The period of the time-expanded signal is $T_d$ and the pulse duration for instance is $t_i$ for an echo signal.

This IF signal "6" is most easily described as a cross-correlation function of the received signal "5" and the heterodyne signal "4". Provided that, amplitude aside, the received pulse be of the same shape as the scanning or heterodyne pulse "4" generated in the local oscillator Lo 9, then the scanning process effects that the pulse contain a number of IF periods that is twice the number of carrier frequency periods in the received pulse. The time transformed pulse therefore appears expanded "twice" with respect to the pulse period. In addition to this distortion in reproduction along the time axis, there also takes place a square distortion of the envelope when the mixer operates as a multiplier; in the limiting case of quasilinear operation, this kind of envelope distortion vanishes.

The pulse duration of the IF signal for the above numerical examples is to the pulse duration $t_c$ of the received signal about as 5000/1 for a central IF of $f_1 = 1$ MHz.

The IF signal "6" is then amplified in the separately controlled amplifiers Rv 13 and Rv 14 to a value sufficient for envelope demodulation. The demodulation takes place in the subsequent envelope demodulator Hd 25 and produces the video signal "12". The relationships between the IF signal "6" and the video signal "12" are shown, like all the signal processes taking place in the time-expanded domain, in FIG. 2b.

For further analysis of the time expanded echo signals "6" a switching command is generated when a target of which the echo signal exceeds an adjustable threshold value appears within a distance range of which the lower and upper limits can be precisely set.

As described above, the pulse modulators Pm 4 and Pm 8 produce spike pulse trains with the pulse repetition frequencies $f_{ps}$ and $f_{pa}$. A fraction of the energy of the two spike pulse trains is fed to a coincidence circuit Kp 7 which in a manner similar to that of the mixer Mi 10 delivers a time expanded reference pulse "7" as shown in FIG. 2b. The time expansion factor is the same as for the IF pulses of the signals "6". The pulse period therefore corresponds to the reproduction frequency period $T_d$ of the IF signal "6".

The time of application of the reference pulse "7" advantageously can be shifted in time. Using a delay member Zg 19 in the feed line of the scanning pulse train of pulse repetition frequency $f_{pa}$ to the coincidence circuit Kp 7, it is possible to have the reference pulse "7" appear a time $T_o$ prior to the first echo signal of the IF signals "6" corresponding approximately to the distance zero and which is determined by cross-talk between transmitter and receiver antennas. The zero meter mark for analysis thus can be coarsely set.

The reference pulse "7" triggers a controlled timing member Zg 15 that may be designed for instance as a monostable flip-flop. As shown by FIG. 2b, the output signal "8" of the timing member Zg 15 is a pulse train of the time expanded period $T_d$ and with an adjustable pulse width $T_v$. In this manner all delays created internally in the equipment can be compensated and the zero meter mark of the radar becomes adjustable.

The trailing edge of the output pulse "8" delivered by the timing member Zg 15 is used to trigger the delayed timing members Zg 17 and Zg 18, which for instance may both also be monostable multivibrators. The adjustable timing member Zg 17 again delivers a pulse train "9" period $T_d$, the adjustable pulse width $T_{min}$ determining the lower limit of the desired target range.

In similar manner the adjustable timing member Zg 18 generates a pulse train "10". In this case the adjustable pulse width $T_{max}$ permits to set the upper limit of the desired target range. The logic connection of the pulse trains "9" and "10" shown in FIG. 2b in the circuit 20 results in a pulse train "11". The "window pulse" of width $T_f$ appearing herein marks the target range that was set. By selecting $T_{min}$ and $T_{max}$ in the two timing members Zg 17 and Zg 18, it is possible therefore to selectively set the distance to be monitored and hence also the range of accuracy. For the above numerical examples there resulted in practice ranges from about ½ m to more than 10 m the resolution amounting to an accuracy of the "window width" of a few cm.

Under some circumstances the above cited timing member Zg 15 can be omitted where it is possible to forego the range adjustment option. In that case the reference pulse "7" is applied directly to the timing members Zg 17 and Zg 18.

As already explained above, the IF signal "6" is demodulated in the envelope demodulator Hd 25 into a unipolar video signal "12". FIG. 2b shows the relation between the IF signal "6" and the video signal "12". Thereupon the video signal "12" is fed to a comparator circuit 22 which receives a reference potential from a hysteresis circuit Sh 24. If the value of the video signal "12" exceeds this reference potential, the comparator 22 delivers a switching signal to the AND circuit 21. If this switching signal should coincide with the preselected window pulse "11", the AND circuit will deliver an output pulse "13". This output pulse "13" starts a retriggering monostable flip-flop Zg 23 that delivers the desired switching command "14". These signals also are shown in FIG. 2.

The switching pulse "14" generated by the timing member Zg 23 at the same time controls the reference potential in the hysteresis circuit Sh 24. The reference potential impulse can be adjusted in height and its polarity is such that in the presence of the switching pulse "14", the threshold value of the comparator 22 will be lowered. In this manner an adjustable hysteresis is obtained in the switching behavior, which for the case of a strongly fluctuating target echo prevents flutter of the switching command and, as long as there are echo signals, makes the switching pulse "14" a permanent signal.

Independently of the adjustability of the switching hysteresis, the radar sensitivity, that is the response threshold for large and small targets, is selected by means of the amplifier control of the IF amplifier Rv 14. To compensate the distance-dependent target echo strength, the principle of sensitivity-time-control (STC) known in radar technology is introduced in the transmission path of the time-expanded IF signal "6". A function generator Fg 16 is controlled by the reference pulse "7" itself or by the somewhat delayed pulse "8" and generates a sawtooth like pulse train also of a period $T_d$. The sawtooth shape of this potential together with the control characteristic of the IF amplifier Rv 13 is so selected that the particular amplification required for the time-controlled target distance scanning is always required.

In order to also carry out a coherent analysis of the IF signals (Doppler analysis) and to detect moving targets, a separate pulse generator to produce an IF reference signal is provided in the clock source TZ 1. This generation can take place in various ways, for instance the reference signal also can be derived in phase-locking manner from the parent oscillator of the clock source TZ 1. The IF reference signal is now assumed to have for instance the IF $f_i$ shown in the dashed circle in FIG. 1 in the clock source TZ 1. This IF reference signal is fed along the path also shown in dashed lines as a permanent signal to a phase discriminator taking the place of the envelope demodulator Hd 25. The phase discriminator delivers a bipolar video signal which makes it possible in known manner to measure a moving target by the absolute value and algebraic sign of the radial speed and/or the radial incremental path in addition to the size of a moving target.

It will be obvious to those skilled in the art that many modifications may be made within the scope of the present invention without departing from the spirit thereof, and the invention includes all such modifications.

What I claim is:

1. In a pulse radar procedure for near distance ranges down to the meter range, including a scanning procedure performing time expansion, further including, generating two higly stable base-band pulse trains (1,3) one of which is processed into transmitter pulses (2) and the other, which has a somewhat lower pulse repetition frequency, into scanning pulses (4), the improvement which comprises
   (a) converting both base-band pulse trains (1,3) into microwave pulse trains (2,4) of which the carrier frequency initial phase is determined in time by one of the controlling base-band pulses in such manner the two microwave pulse trains (2,4) always are coherent with respect to the carrier frequency thereof by means of their associated pulse repetition frequency, and
   (b) multiplying the received echo signals (5) in a microwave mixer (Mi 10) by the microwave scanning pulses (4), thereby forming time-expanded intermediate frequency signals (6) which are selectively reinforced and demodulated into video signals (12).

2. A pulse radar method according to claim 1, including applying a time-expanded reference pulse (7) in time to the video signals (12) before the first echo signal of the intermediate frequency signals (6) determined by the cross-over from the transmitting to the receiving antenna arrives at the video signal (12).

3. A pulse radar procedure according to claim 1 including a fixed-target analysis from the video signals (12) and the reference pulse (7).

4. A pulse-radar procedure according to claim 1 including forming a separate intermediate-frequency reference signal ($f_i$) which is coherent with the receiver-side time-expanded intermediate-frequency signals (6).

5. A pulse radar procedure according to claim 4 including a Doppler analysis of the receiver-side time-expanded intermediate-frequency signals (6) and of the intermediate-frequency reference signal ($f_i$).

6. A pulse radar procedure according to claim 1 including shaping in known manner the two pulse trains (1,3) into spike pulses with very steep leading edges.

7. In a circuit arrangement to implement a pulse radar procedure for near distance ranges down to the meter range, including in a transmitter-side clock source (TZ1) two pulse generators for pulse trains slightly varying in their pulse repetition frequencies (fps, fpa), the improvement comprising that each generator is followed by pulse shaping stages (Np2, Pm4, and Np3, Pm8) and microwave oscillators (Os5, Lo9), where the microwave oscillator (Os5) for the first pulse train (1) is connected to a transmitting antenna (S) and the microwave oscillator (Lo9) for the second pulse train (3) is connected to a microwave mixer (Mi 10) processing the received echo signals (5) into intermediate frequency signals (6), in that further a coincidence circuit is connected to the two transmission paths of the pulse trains (1,3) before the microwave oscillators (Os5, Lo9), and in that on one hand the receiver part, consisting of the microwave mixer (Mi 10), the intermediate-frequency part (Bp12, Rv13, Rv14) and the demodulation stage (Hd 25) and on the other hand of the coincidence circuit (Kp7) are connected to an analyzing system (Zg 17, Zg 18, 20, 21, 22, Zg 23, Sh 24).

8. A circuit arrangement according to claim 7, in which the two microwave oscillators (Os5, Lo9) are designed to be passive microwave resonators energized by the spike pulses of the particular pulse modulators (Pm4,Pm8).

9. A circuit arrangement according to claim 8 in which the microwave resonator (Os 5) delivering the transmitter pulses (2) is followed by a microwave band-pass filter (Bp 6).

10. A circuit arrangement according to claim 7, including a function generator (Zg 16) providing a signal for controlling the amplification of the intermediate frequency amplifier (Rv 13) as a function of time that a range-independent target echo amplitude is obtained.

11. A circuit arrangement according to claim 7, in which the two microwave oscillators (Os5, Lo9) are designed as active, self-exciting oscillators which are gated in such manner by the pulse modulators (Pm4, Pm8) that the gating pulse induces an initial oscillation in the microwave resonator by means of the energy supplied by the active oscillator circuit.

12. A circuit arrangement according to claim 7 including means (Zg 19) associated with the coincidence circuit to shift the time of application of the reference pulse (7).

13. A circuit arrangement according to claim 12 including a delay member (Zg 19) inserted in the feed line of the scanning pulse train (3) to the coincidence circuit (Kp 7) forming the time-expanded reference pulse (7).

14. A circuit arrangement according to claim 12 or claim 13 including two parallel delay members (Zg 17, Zg 18) in the transmission path of the reference pulse (7) and with differently adjustable delay times ($T_{min}$, $T_{max}$) and with a subsequent gate circuit (20) implementing a logic connection for the reference pulse transmitted through the two partial paths (9,10).

15. A circuit arrangement according to claim 14 including a commonly adjusted delaying member (Zg 15) preceding the two parallel delay members (Zg 17, Zg 18).

16. A circuit arrangement according to claim 14 in which the monostable flip-flops triggered by the reference pulse (7) are the adjustable delay members (Zg 17, Zg 18).

17. A circuit arrangement according to claim 7 including an adjustable hysteresis circuit (Sh 24) determining the reference threshold value of a comparator (22), in the transmission path of the demodulated video signals (12).

18. A circuit arrangement according to claim 7 in which the system (Hd 25) demodulating the time-expanded intermediate-frequency signals (6) is designed as a phase discriminator and is connected with a separate intermediate-frequency generator ($f_i$) which is controlled in phase-locked manner by a parent oscillator of the clock source (TZ 1).

* * * * *